United States Patent
Da Silva

(10) Patent No.: US 10,491,391 B1
(45) Date of Patent: Nov. 26, 2019

(54) FEEDBACK-BASED DATA SECURITY

(71) Applicant: Amazon Technologies, Inc., Reno, NV (US)

(72) Inventor: Fabian Da Silva, Sao Paulo (BR)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 194 days.

(21) Appl. No.: 15/274,145

(22) Filed: Sep. 23, 2016

(51) Int. Cl.
*H04L 9/32* (2006.01)
*H04L 9/08* (2006.01)

(52) U.S. Cl.
CPC .......... *H04L 9/3226* (2013.01); *H04L 9/0861* (2013.01)

(58) Field of Classification Search
CPC .............................. H04L 9/3226; H04L 9/0861
See application file for complete search history.

(56) References Cited

U.S. PATENT DOCUMENTS

| | | | | |
|---|---|---|---|---|
| 8,880,435 | B1* | 11/2014 | Catlett | G06Q 20/10 705/75 |
| 9,213,812 | B1* | 12/2015 | Windell | G06F 21/46 |
| 2007/0250920 | A1* | 10/2007 | Lindsay | G06F 21/31 726/7 |
| 2009/0259839 | A1* | 10/2009 | Jung | G06F 21/33 713/155 |
| 2010/0211802 | A1* | 8/2010 | Humphries | G06F 21/78 713/193 |
| 2015/0106216 | A1* | 4/2015 | Kenderov | G06Q 20/4014 705/21 |
| 2015/0178518 | A1* | 6/2015 | Taratine | G06F 21/34 726/19 |
| 2016/0226908 | A1* | 8/2016 | McGeehan | G06F 21/55 |
| 2017/0195346 | A1* | 7/2017 | Be'Ery | H04L 63/0428 |

OTHER PUBLICATIONS

Wei et al, A conceptual Model for Preventing Web Bypass Vulnerabilities, 2011 International ConfOn Electronic & Mechanical Engineering, IEEE, Aug. 2011 (Year: 2011).*
Chang et al, An E-intelligence Approach to E-commerce Intrusion Detection, 2005 IEEE International Conference on Granular Computing, Jul. 2005 (Year: 2005).*

* cited by examiner

*Primary Examiner* — Luu T Pham
*Assistant Examiner* — Harvey I Cohen
(74) *Attorney, Agent, or Firm* — Hogan Lovells US, LLP

(57) ABSTRACT

Encryption of sensitive data on consumer devices is provided with format-preserving cryptography and feedback via the use of security identifiers. A request to access the sensitive data will specify user credentials for the access. The submitter is requested to confirm a security identifier for the requested access. An incorrect security identifier will be presented for incorrect credentials, which will be easy for a user to identify but not for an attacker or other unauthorized user. If the incorrect security identifier is confirmed, the device assumes the request was received from an unauthorized source. The sensitive data is stored under format-preserving cryptography, such that false data values can be generated that have the correct format. An unauthorized user receiving the false data will not be readily able to determine the data received is incorrect, and will be likely to discontinue the attack, particularly for an automated process.

18 Claims, 7 Drawing Sheets

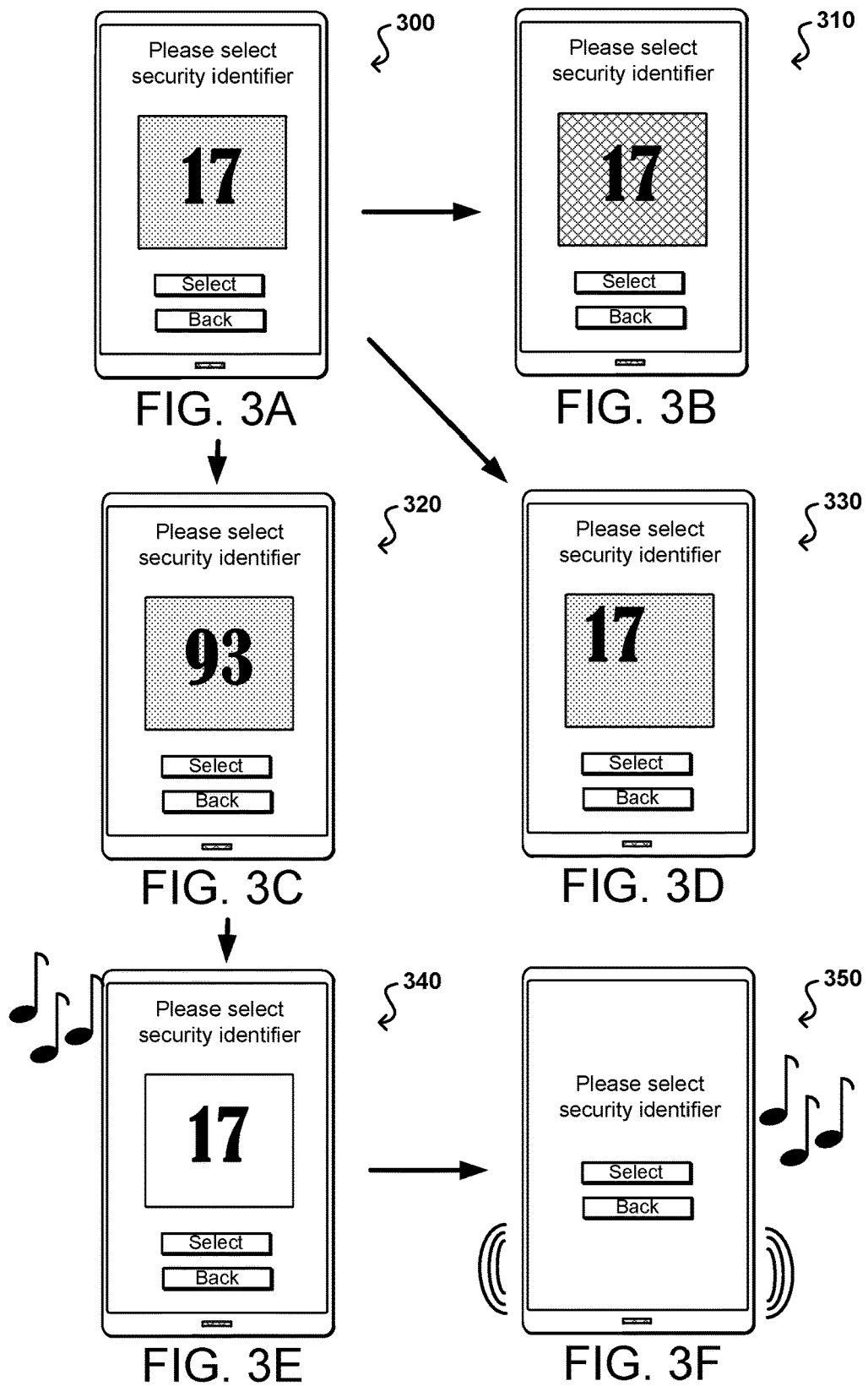

FEEDBACK-BASED DATA SECURITY

BACKGROUND

Users are increasingly utilizing content in digital format, often storing information digitally on various electronic devices. Oftentimes this data is sensitive, such that a user will want the data to be securely stored. While access to the data can be protected with usernames and passwords, these security mechanisms can be determined by hackers or other third parties who can gain unauthorized access to the sensitive data. While various other security mechanisms exist, lightweight solutions for securing access to data on personal devices, such as commodity smart phones or tablet computers, are not yet adequate for such purposes.

BRIEF DESCRIPTION OF THE DRAWINGS

Various embodiments in accordance with the present disclosure will be described with reference to the drawings, in which:

FIGS. 3A, 3B, 3C, 3D, 3E, and 3F illustrate ways in which a security identifier can be generated or modified in accordance with various embodiments.

DETAILED DESCRIPTION

Figure 1A:
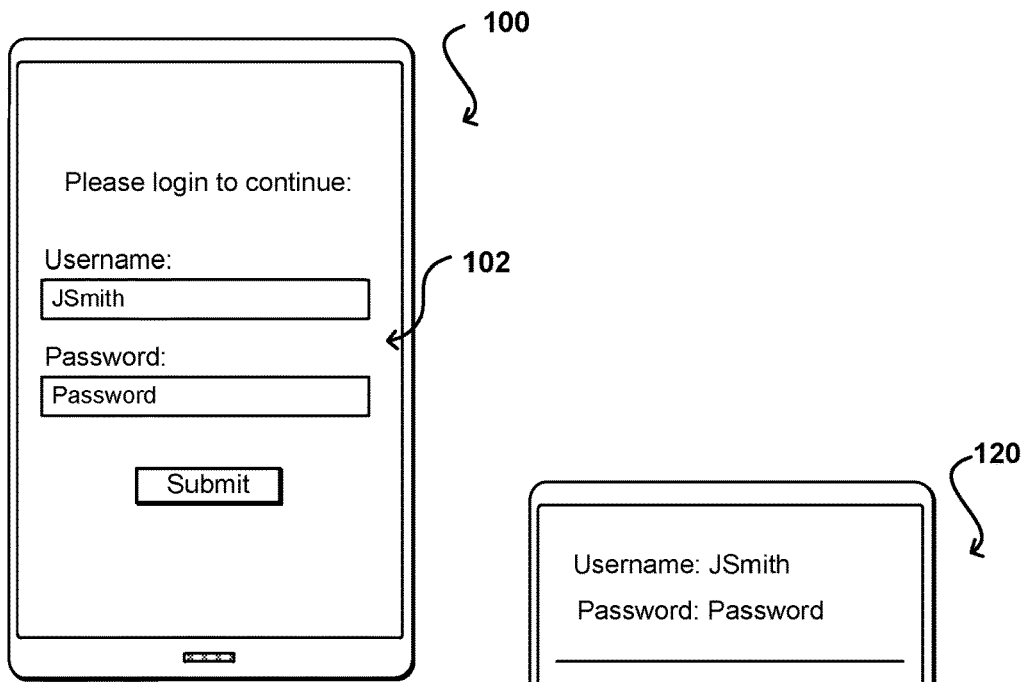
FIGS. 1A, 1B, and 1C illustrate displays that can be presented for a feedback-based data security process that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the secure storage of sensitive data on an electronic device. In particular, various embodiments provide for the encryption of sensitive data with format-preserving cryptography and feedback via the use of security identifiers. Sensitive data for a user can be stored on a computing device, and one or more user credentials can be specified to gain access to that data. A security identifier can also be specified for the sensitive data. When a request is received to access the data, the request will present user credentials. Upon presenting the credentials, the user (or entity, system, or process submitting the request) is requested to confirm the security identifier for the sensitive data. If the correct user credentials are submitted then the correct security identifier will be presented. If incorrect user credentials are submitted then an incorrect security identifier will be presented. A valid user receiving the incorrect security identifier will recognize that something is wrong and will attempt to enter the correct credentials. An unauthorized user will not know whether the security identifier is correct, and thus will either abandon the access attempt or confirm the incorrect identifier.

If the incorrect security identifier is confirmed, the computing device can assume that the credentials were received from an unauthorized source. The sensitive data can be stored under format-preserving cryptography. Accordingly, false data values can be generated that have the correct format, and these values can be returned to the unauthorized user. The unauthorized user will not be able to easily determine, based on the data alone, that the credentials submitted were incorrect or that the data received is not correct. In at least some embodiments, algorithms can be used that generate data values that are close to the correct values, such that it will be more difficult for a party receiving the incorrect values to determine that the values are incorrect. Such an approach enables potential attackers to be identified, while minimizing the likelihood of an attacker continuing an attack until the correct credentials are obtained. If new false data values are generated for each incorrect attempt then the attacker will be unable to continue the attack until a credential combination is entered that results in a unique set of data. Such an approach can also be implemented on commodity hardware, such as portable computing devices, that typically do not provide hardware security modules or other such secure enclaves.

Various other such functions can be used as well within the scope of the various embodiments as would be apparent to one of ordinary skill in the art in light of the teachings and suggestions contained herein.

In many instances users will want to store data on various computing devices, such as notebook computers, smart phones, tablet computers, and the like. In some cases the data may be sensitive data, such as may include social security numbers, credit card numbers, access tokens, and other such data that the user may want to prevent from being accessed by unintended third parties. Many conventional approaches use information such as a username and password pair to protect access to the sensitive data and other such information or resources on the computing device. Unfortunately, the use of such information for security can be at risk for discovery by unauthorized parties, such as hackers launching brute-force attacks against the device. In such an attack, an automated process having obtained a public username can continually attempt passwords until the correct password is guessed, whereby access is granted, or until a maximum number of incorrect attempts is reached, in which case the data access may be cut off or the data repository destroyed, among other such options. In other instances an attack may use a common or selected password and attempt to guess various usernames, which can be more difficult but will be less likely to result in a lockout in various systems. Even for encrypted credential pairs an advanced hacker can gain access in less than ten minutes in some cases. If the repository is isolated or destroyed, the data repository and its access will eventually be restored, which enables the brute force attack to continue. Even for symmetric key-encrypted data there is a high risk of unauthorized access resulting from brute force attacks. While certain mechanisms such as trusted platform modules exist that are robust to these types of attacks, these mechanisms are often not available on computing devices such as mobile-based systems and/or internet-of-things (IoT) devices.

Accordingly, approaches in accordance with various embodiments can utilize a feedback mechanism to help a user determine whether the correct credentials have been provided. The feedback mechanism can also make it more difficult for a hacker to determine whether the credentials for a brute force attack were correct. The feedback can be provided for each access attempt or after a number of incorrect attempts, among other such options. To further increase the difficulty in determining whether the credentials for an attack can be correct, data can be returned that has the appropriate format and relatively accurate values, such that it can be difficult for a hacker or other such entity or process to determine whether the data obtained is accurate and the attack successful.

Figure 1B:
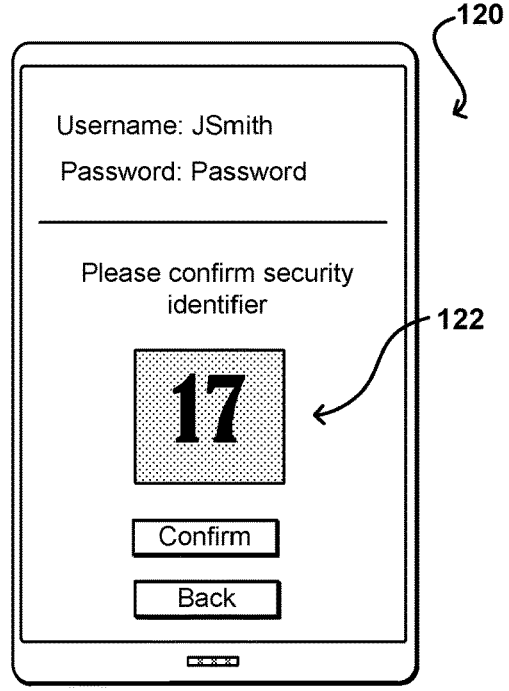
Figure 1C:
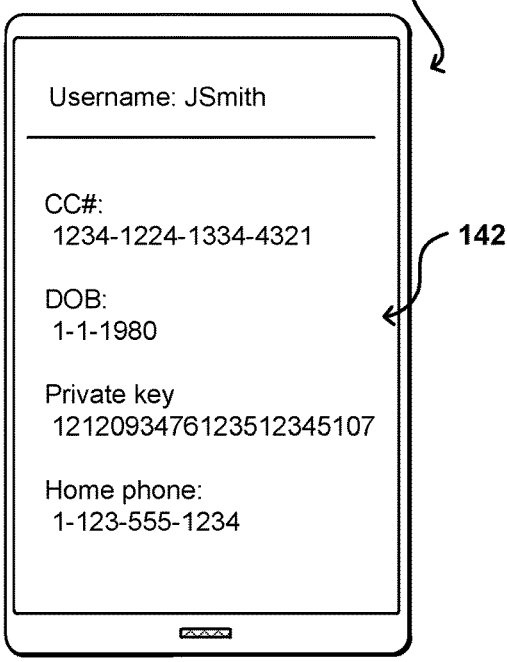

FIGS. 1A through 1C illustrate example displays that can be provided during such a process in accordance with various embodiments. In this process, a user might request to obtain access to data stored on a computing device, although various other requests for access might trigger such a process in various embodiments. In the display 100 of FIG. 1A, the computing device renders for display a set of graphical elements 102 enabling a user to specify a set of credentials, in this example a username and a password, although other credentials such as a personal identification number (PIN), signature, fingerprint, retinal scan, biometric entry, or other such credential can be presented as well within the scope of the various embodiments. The access credential in some embodiments can also comprise a signal carrying any of these specific types of credentials. In this example, the user enters a username and password and can then select a "submit" or similar option to cause those entries to be submitted and evaluated in order to attempt to gain the desired access.

FIG. 1B illustrates an example display 120 for a feedback step of the process that can be presented in accordance with various embodiments. As mentioned, a feedback step can be presented for each access attempt, for random access attempts, after an incorrect attempt, or after a number of incorrect attempts, among other such options. In this example a security identifier 122 is displayed that is associated with the user credentials. A person viewing, hearing, feeling, or otherwise sensing a version of the identifier (or automated process obtaining the identifier) must confirm that this is the appropriate identifier for the access before gaining the access. The identifier in this example includes a number that is easy for a user to remember, and that can be specified by the user, over a background having a specified color. Various other identifiers can be used as well as discussed and suggested elsewhere herein. If the user presented the proper username and password pair, and confirmed the correct security identifier, then access to the data can be provided, such as is illustrated in the example display 140 of FIG. 1C.

Figure 2A:
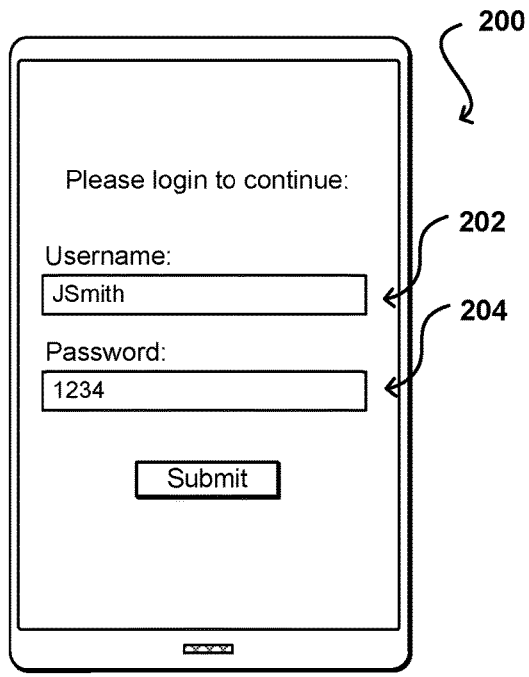
FIGS. 2A, 2B, 2C and 2D illustrate displays that can be presented for incorrect data entered into a feedback-based data security process that can be utilized in accordance with various embodiments.

It might be the case, however, that an unauthorized entity or process attempted to gain access to the data using an attack whereby a guess was made as to the username and/or password, resulting in an incorrect username/password pair being submitted. This is illustrated in the example display 200 of FIG. 2A, wherein the correct username was entered but an incorrect password. Upon those credentials being submitted, an authentication (or other such) process can determine that the credentials are incorrect for the requested access. In conventional approaches, a notification could be provided indicating that the credentials were incorrect, whereby another, different pair could be attempted.

Figure 2B:
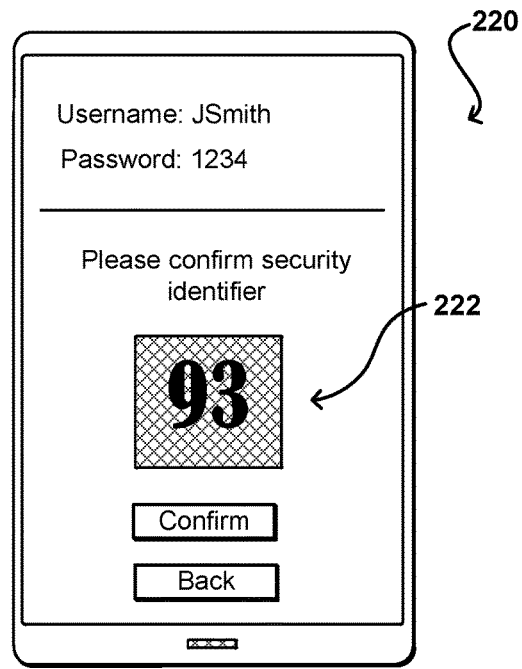

In this example approach, however, a security identifier 222 is presented, as illustrated in the display of FIG. 2B, that is not the correct security identifier for the access. This feedback requirement can be difficult for a brute force attempt to crack, as the process will be unable to determine at this point whether or not the identifier is correct for the access. The attack can confirm, and gain access to data that appears to be the correct data as described below, if the security identifier is correct, or can go back and change the username password pair, but will have no confirmation as to whether or not the previously submitted pair was correct. Thus, it is likely that the attack will confirm that the identifier is correct in order to attempt to gain access. If an incorrect identifier was confirmed by the attacker, but then access was not granted, the attacker could determine that at least the combination of the username and password was incorrect and could continue the attack. Such an approach can be beneficial to the correct user as well, as the user might inadvertently type or otherwise enter incorrect credentials, and obtaining the incorrect security identifier can indicate to the user that the incorrect credentials must have been provided. In some embodiments where the user forgets the identifier, or where another person setup the user account, the process may continue as if the user is an unauthorized party, but the user can receive a notification that an attempt with incorrect credentials was detected such that the user can know to discard the accessed data. In some embodiments the user can be notified for any such access attempt, in order to know when the user submitted the wrong credentials or when someone else attempted to gain access with incorrect credentials, among other such options.

Figure 2C:
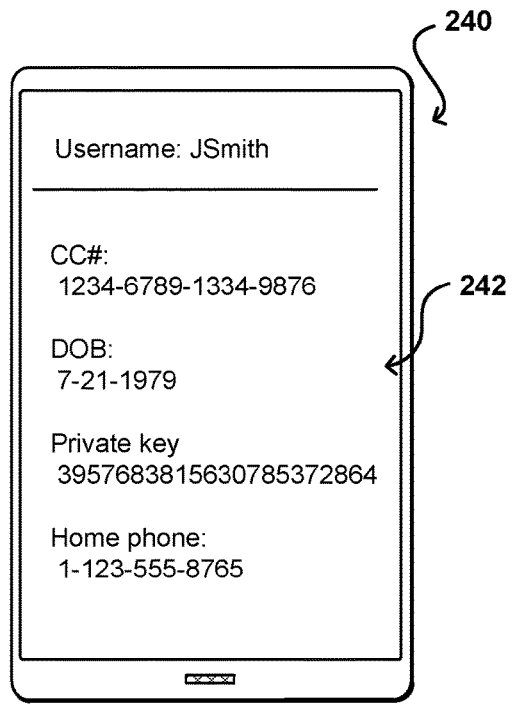
Figure 2D:
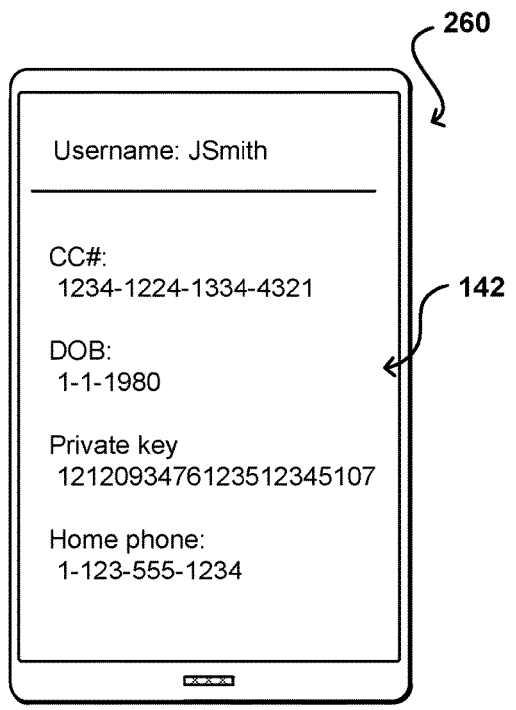

When an attacker confirms the incorrect security identifier after submitting incorrect credentials, that attacker can receive access to data that appears to be the correct data. For example, the data 242 illustrated in the display 240 of FIG. 2C includes the appropriate types of data 142, with the data also having the appropriate format (at least where appropriate). FIG. 2D illustrates a display 260 of the correct data 142 from FIG. 1C for ease of comparison. It can be seen that the data has the same format, such as where the credit card numbers each have the same number of characters in the same pattern as may comply with a specified credit card format. Credit card numbers, along with other types of data (typically key, value pairs) including social security numbers, date of birth, public or private keys, phone numbers, access tokens, health records, and the like, may comprise sensitive data that the user wants to protect from being obtained by unauthorized parties. By presenting data with similar formats, it can be difficult for an attacker obtaining the data to determine whether authorized access was gained to the correct data. For each of the data values displayed, the format of the type of data was maintained between the correct display 142 and the display 242 of incorrect values.

In at least some embodiments a determination as to whether the data is correct can be made even more difficult by providing values that are near the correct values, or within a determined range of the correct values. While presenting a date of birth field that has the correct format can help hide the fact that the incorrect data was generated by an algorithm, if the date of birth is a date in 1783 then it can be determined without too much effort that the data is false data. Accordingly, approaches in accordance with various embodiments can attempt to generate incorrect data that, without additional information, would be difficult to determine as being inaccurate. For example, the date of birth difference between the correct and incorrect values is less than one year. Without more information, it would be difficult to determine which date is correct. Similarly the home phone number data can have the same area code in order to prevent an easy determination that the number corresponds to a different geographical region, and the credit card number might have the right first four numbers, or other such characteristic, indicating the bank, type of card, or other such information. Any restrictions on the value of the format can be implemented, and various ranges or rules utilized that can make it difficult to determine whether the values are correct based on the values alone.

Thus, an attacker or other entity or process attempting to gain unauthorized access with incorrect (or expired) credentials will receive data that will be difficult to determine is not the correct data. The data in such an example that is obtained by the attacker will have the appropriate format, and will have values that seem reasonable for the types of data obtained. The attacker, particularly for automated processes or bots, may then store the data and move on to another potential target without further attempts to determine the correct credentials. Information for the attack can also be logged, and the corresponding user or administrator notified, such that any appropriate remedial action can be taken, such as to block an IP address or source, change credentials, etc.

As mentioned, the person attempting to obtain access can be provided with a security identifier, or other such element, that can enable an authorized user to confirm whether the identifier is correct, and if the identifier is not correct then know to go back and change or correct to the proper credentials for access. In order for this security identifier to be effective, however, the identifier needs to be something that an authorized user can remember or otherwise easily verify.

Accordingly, approaches in accordance with various embodiments can enable a user (or other authorized entity) to select, create, or otherwise provide or determine the security identifier to be used for access to sensitive data stored on a computing device, or in another such location. The security identifier can also potentially be rotated or modified upon request by the user, or caused to be rotated periodically to enhance security, among other such options. In some embodiments users can generate any appropriate security provider, while in other embodiments an application, provider, or other such entity might specify the available types of customization, identifier templates, minimum identifier requirements, and the like.

FIG. 3A illustrates an example status identifier 300 that can be generated in accordance with various embodiments. In this example, the status identifier is an image that is generated that includes at least two elements: a number and a colored background. It should be understood that other text or characters, such as names or symbols, can be used as well, as well as images, designs, patterns, and the like. Such an identifier can be relatively simple for a user to remember, as the user can select a number that has meaning to the user, and basic colors can also be relatively easy to remember. As discussed elsewhere herein, there may be only a set of available colors, or colors generated for fake identifiers may need to be at least a minimum number of shades apart, as the human eye can have difficulty distinguishing between very similar colors, particularly when they are not displayed side by side and can be viewed under different conditions.

The user can have the option of customizing the identifier. As illustrated in the view 310 of FIG. 3B, the background color or pattern can be modified to one easily remembered by the user (or otherwise determined), and as illustrated in the view 320 of FIG. 3C the number, characters, or text can be modified as well. In some embodiments, as illustrated in the view 330 of FIG. 3D, the position and/or orientation of the number in the identifier can be modified as well for further security. This can include translation, as well as rotation or mirroring, among other such options. Various other options can be provided as well, such as to modify a shape or size of the identifier, number of elements in the identifier, font or color of the text, number of colors in the background, etc.

Various other types of identifiers, or identifier aspects, can be options as well. For example, in the view 340 of FIG. 3E the user can select to have a sound, such as a bell, ring tone, or signal, or sequence of such sounds, emitted as part of the security identifier. Various other audio options can be used as well, such as verbal phrases, song clips, and the like. This option can be difficult for automated processes to analyze and confirm, and can help to provide secure options for those with visual impairment, among other such advantages. As illustrated in the view 350 of FIG. 3F, the user can also specify various vibration patterns, in addition to, or in place of, an audible portion of the identifier. The vibration pattern can also be specified for situations where the device might be set on vibrate or silent mode, etc. Various other identification approaches can be used as well, such as may include haptic feedback or flashing lights on the device, among other perceivable patterns or presentations via the device.

It should also be mentioned that the approaches discussed herein are not intended to replace other measures, such as full disk encryption or native operating system features, for enforcing data security on various devices. These approaches are meant to supplement at least some of these features in order to provide additional security in a way that does not require significant additional resources or hardware, but can be implemented effectively on commodity hardware with little additional processing or resources required. The approaches discussed with respect to the various embodiments can also cause attackers to shorten the period of their attacks, which can reduce resource consumption and improve overall system security and availability in the event of an attack.

Figure 4:
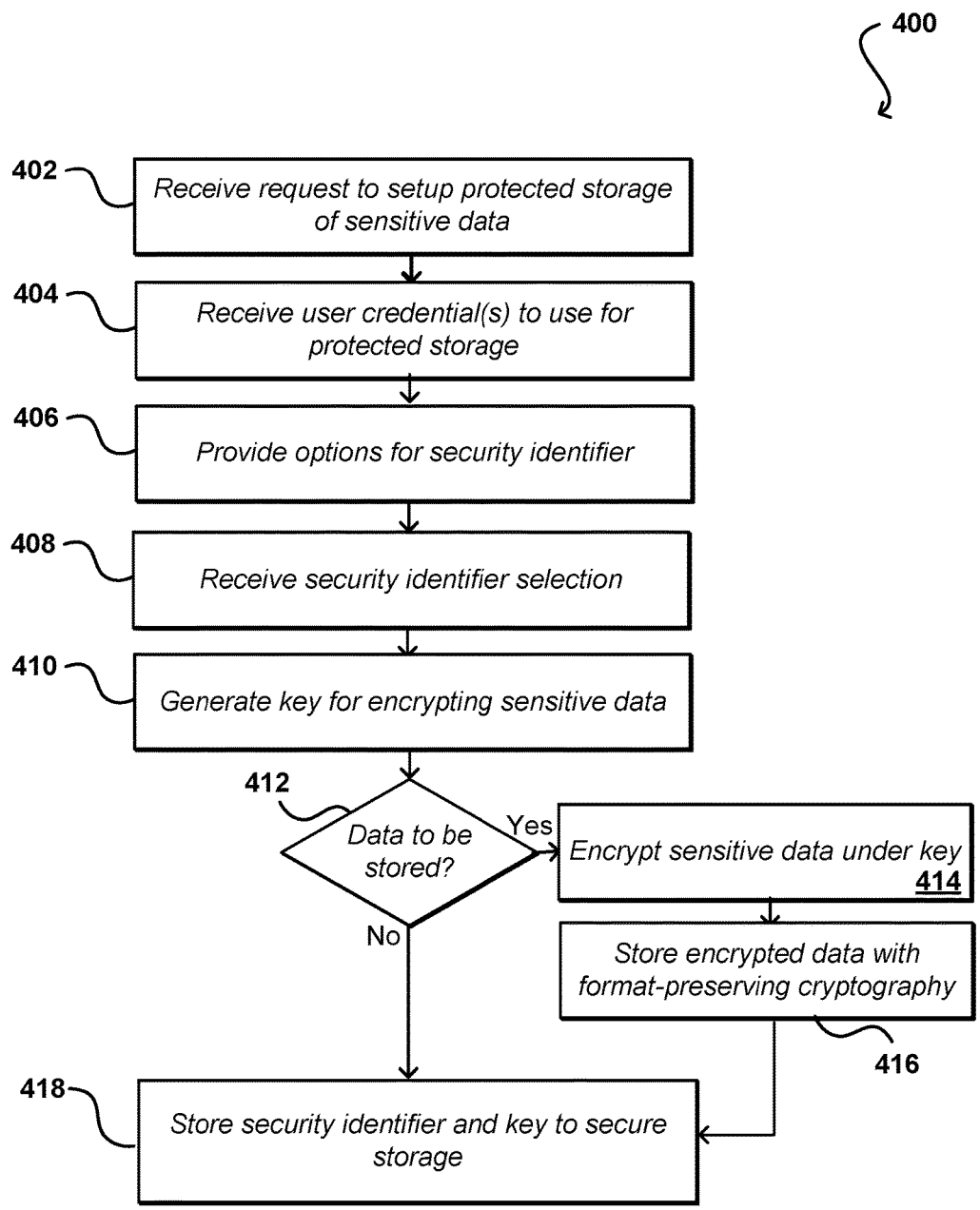
FIG. 4 illustrates an example process for protecting sensitive data using feedback-based data security that can be utilized in accordance with various embodiments.

FIG. 4 illustrates an example process 400 for protecting data with a security identifier that can be utilized in accordance with various embodiments. It should be understood that for any process herein there can be additional, fewer, or alternative steps performed in similar or alternative orders, or in parallel, within the scope of the various embodiments unless otherwise specifically stated. In this example, a request is received 402 to setup protected storage of sensitive on a computing device. This can be a request from a user, application, or other such entity or process, and the device can be any appropriate computing device as discussed and suggested elsewhere herein. Further, the protected storage can be for specific data, a data repository, a group or set of data, or any other identified data to be stored. As part of the request, or as part of a separate call, request, or entry, one or more user credentials can be received 404 that are to be used for the protected storage. As mentioned, in many cases this can include a passcode, password, or PIN to be used along with a username or user identifier as part of a credential pair, but other credentials can be used as well, such as certificates, access tokens, and the like. The username may also be provided or generated, or an existing username associated with that user can be utilized, among other such options.

In addition to obtaining the user credentials, and verifying that the credentials meet any credential criteria, such as minimum length or variety of characters, the process can also provide 406 various options enabling the user to select, generate, or otherwise determine a security identifier to be associated with the protected storage of the sensitive data.

As mentioned, the options can include things like identifier templates, available colors, text or image options, placement options, available sounds or vibrations, and the like. In some embodiments guidelines or rules might be provided instead of options, whereby the user can provide any appropriate identifier that satisfies the rules of guidelines. Various other approaches can be used as well within the scope of the various embodiments.

Once the user credentials have been received and verified, and an acceptable security identifier selection has been received 408, the process can proceed to setup the protected storage. In this example, this can include generating 410 (or otherwise obtaining) a cryptographic key for use in encrypting the sensitive data. The key can be any appropriate key or other cryptographic element as known or used for such purposes, except that in some embodiments there may be minimum criteria or limitations, such as may relate to minimum length, key format, and the like. A determination can be made 412 as to whether there is any sensitive data to be stored, such as may have been received or specified by the request to setup the protected storage. If so, the sensitive data can be encrypted 414 under the generated key for the customer, and the encrypted sensitive data can be stored 416 to an appropriate location on the computing device (or another such location), protected with format-preserving cryptography. Format-preserving cryptography, generally speaking, includes encryption techniques whereby the original formatting of the plaintext data is preserved. For example, the output of format-preserving encryption techniques (e.g., the ciphertext) is generally in the same format as the input (e.g., the plaintext). An example of a format preserved utilizing such a technique would be structured data, such as credit card or Social Security numbers that have a defined number and/or order of characters (e.g., digits, dashes, etc.), although other formats may be preserved as well. In order to further secure the sensitive data, the key and the security identifier, or information useful in generating the security identifier, can be stored 418 to the device (and potentially to remote storage as well for recovery purposes) encrypted or otherwise protected using the user credential.

Figure 5:
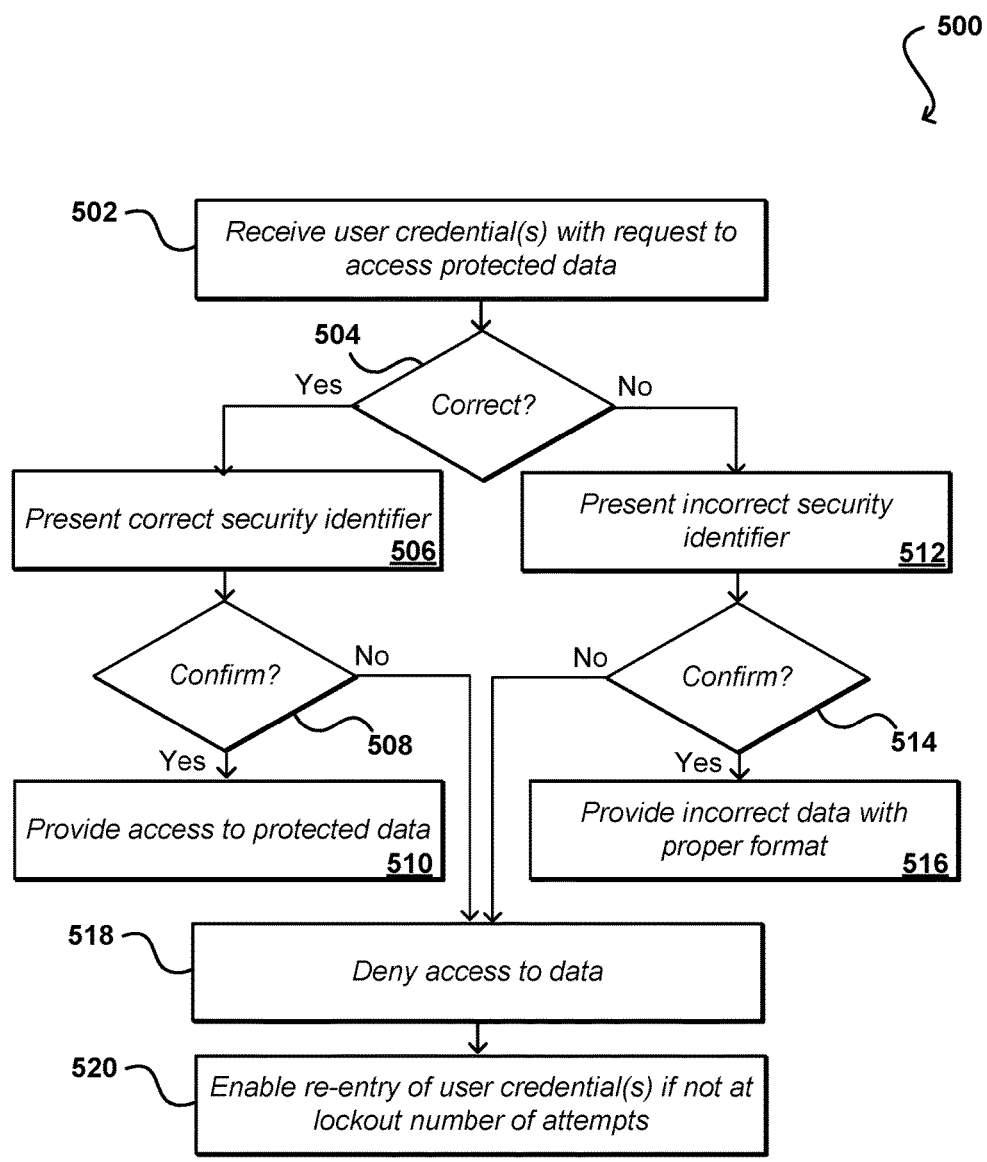
FIG. 5 illustrates an example process for determining whether to grant access to sensitive data using feedback-based data security that can be utilized in accordance with various embodiments.

FIG. 5 illustrates an example process 500 for processing a request for access to sensitive data that can be utilized in accordance with various embodiments. In this example, one or more user credentials are received 502 corresponding to a request for access to protected data stored on a computing device. The credentials can be received with the request, or entered in response to a prompt generated upon receiving the request, among other such options. As mentioned, the credentials can include any appropriate credentials, such as a username and password pair, etc. The credentials can be evaluated using any appropriate mechanism or process for evaluating and confirming user credentials, such as may be located on the device or offered though a remote system or service including appropriate authentication and/or authorization processes. A determination is made 504 as to whether the provided credentials are the correct credentials for the requested access.

If the credentials provided are the correct credentials, then the correct security identifier can be presented 506 on the computing device for confirmation by the user. As mentioned, the security identifier will be a visual identifier or graphical element in many embodiments, as may have been generated or selected by the user, but can also have audible or haptic feedback elements in other embodiments. Confirmation of the security identifier can be required in order to make it more difficult for a potential attacker to determine whether or not they presented the correct user credentials for the protected data. The user (or entity, application, or process) can confirm the correct identifier or take another responsive action. If it is determined 508 that the correct security identifier was confirmed for the correct user credentials, then access to the protected data can be provided.

If the provided credentials are determined to be incorrect or expired credentials, then an incorrect security identifier can be presented 512. The incorrect identifier might have similar aspects, such as by including a number and solid background color if that corresponds to the aspects of the correct identifier, but can have a different number and/or color presented that the user would identify as incorrect but would be difficult for a different user or entity to verify. In some embodiments the incorrect identifier may be very different, such as by including animation, sounds, vibrations, or other aspects that are not included in the correct identifier, such that the authorized user will easily be able to determine that the identifier is incorrect but a different user or entity would not be able to so easily make such a determination. If the incorrect security identifier is confirmed 514, then a determination can be made to provide 516 incorrect data to the user. As mentioned, the format-preserving cryptography can enable incorrect data to be provided that has the correct format, and algorithms can be used to cause the incorrect data to have reasonable values for the fields, such that it will be difficult for a person or process other than the user to determine that the values are incorrect.

If either the correct or incorrect security identifier is not confirmed, and another responsive action taken, then the access to the protected data for the received request can be denied 518. As mentioned, in many embodiments there can be a maximum number of attempts tried, at least over a period of time, before a lockout of the data occurs or another such action is taken. If the number of lockout attempts has not been reached, a re-entry of user credentials can be enabled 520 and the process can repeat itself. If the lockout number has been reached, then re-entry of the credentials for purposes of accessing the sensitive data can be prevented, at least for a determined period of time. As mentioned, in some embodiments this can involve destroying and rebuilding the data store, among other such options.

In some cases, the sensitive data might comprise an access token or other keys used to access a backend system. Upon providing the correct user credentials and confirming the correct security identifier, the user key can be used to decrypt the access token, which may be stored in secure storage on the device. The access key can then be used to access the backend system or a sensitive storage device (SSD), among other such options.

Figure 6A:
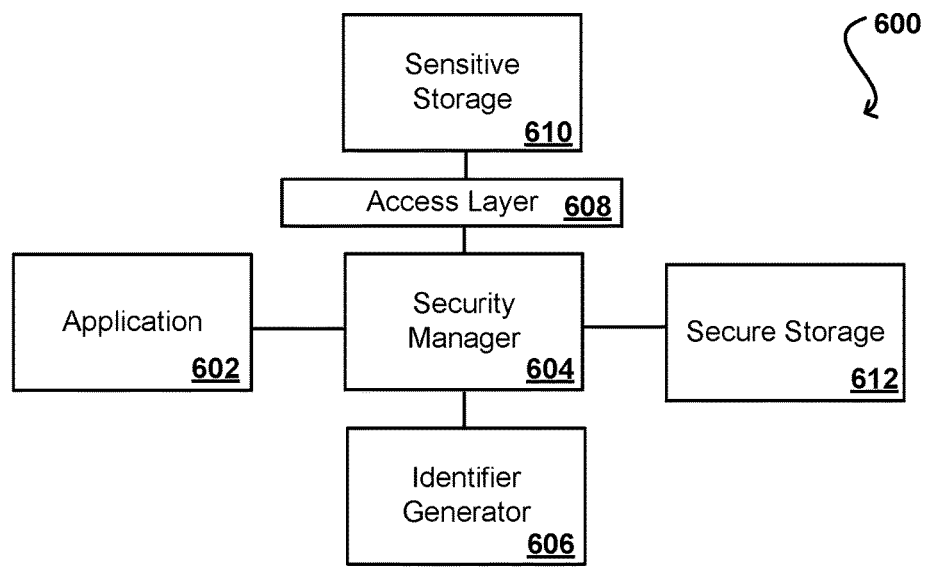
FIGS. 6A and 6B illustrate components that can be utilized to implement the various embodiments.
Figure 6B:
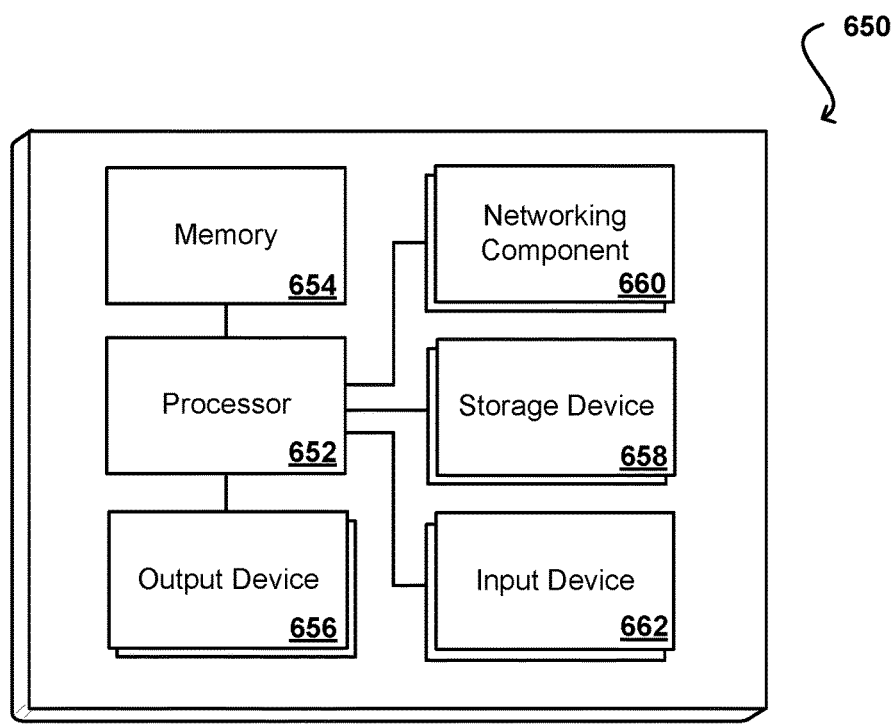

FIG. 6A illustrates a system 600 of example software modules or components that can be utilized to implement aspects of the various embodiments, using a system 650 of hardware component such as those illustrated with respect to FIG. 6B. In this example, an application 602 executing on a client device might work with a security manager 604 to manage keys, user credentials, and/or sensitive data on behalf of the application, as well as the user credentials utilized to access the sensitive data. In this example the security manager 604 can work with an identifier generator 606 to generate a security identifier for a user of the application 602, where a key obtained by the security manager 604 and the security identifier can be stored to secure storage 612, encrypted using the user credentials or other appropriate information. The sensitive data will be encrypted by the key and stored to sensitive storage 610 under format-preserving cryptography, which can be a dedicated sensitive data storage or region of data storage allocated to the sensitive data, among other such options. There can be an access layer 608 between the sensitive storage 610 and the application 602 and security manager 604 such that the sensitive data must be accessed through the access layer 608, which respects format-preserving cryptography, by a user or entity that has been authenticated by the security manager 604 using the user credentials and security identifier. The security manager 604 can also work with the identity generator 606 to generate fake security identifiers for entities that have provided incorrect user credentials as discussed elsewhere herein.

FIG. 6B illustrates hardware components of an example computer system 650 that can be utilized to implement aspects of the various embodiments. As mentioned elsewhere herein, the device can be any type of device able to store data and process requests, such as may include a desktop computer, notebook computer, smart phone, tablet computer, and wearable computers such as smart watches or glasses. Potential devices can also include, for example, devices such as smart cars, set top boxes, gaming consoles, internet of things devices, interactive speakers, and the like. In this example, the device includes at least one processor 652 for executing instructions that can be stored in a memory device or element 654. As would be apparent to one of ordinary skill in the art, the device can include many types of memory, such as RAM or ROM, for storing information such as program instructions for execution by the at least one processor 652, and can include one or more additional storage devices 658 or computer-readable media, such as may include magnetic or optical drives or flash storage, which can be used to store information such as images or data. Removable or accessible memory or storage can also be utilized in various embodiments. The device will generally include one or more output devices 656. These can include, for example, at least one type of display element 656, such as a touch screen, electronic ink (e-ink), organic light emitting diode (OLED) or liquid crystal display (LCD), although devices such as servers might convey information via other means, such as through a system of lights and data transmissions. Other output devices can be utilized as well, as may include speakers, vibration elements, haptic feedback elements, and the like. The device typically will include one or more networking components 660, such as a port, network interface card, or wireless transceiver that enables communication over at least one network. The device can include at least one input device 662 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 7:
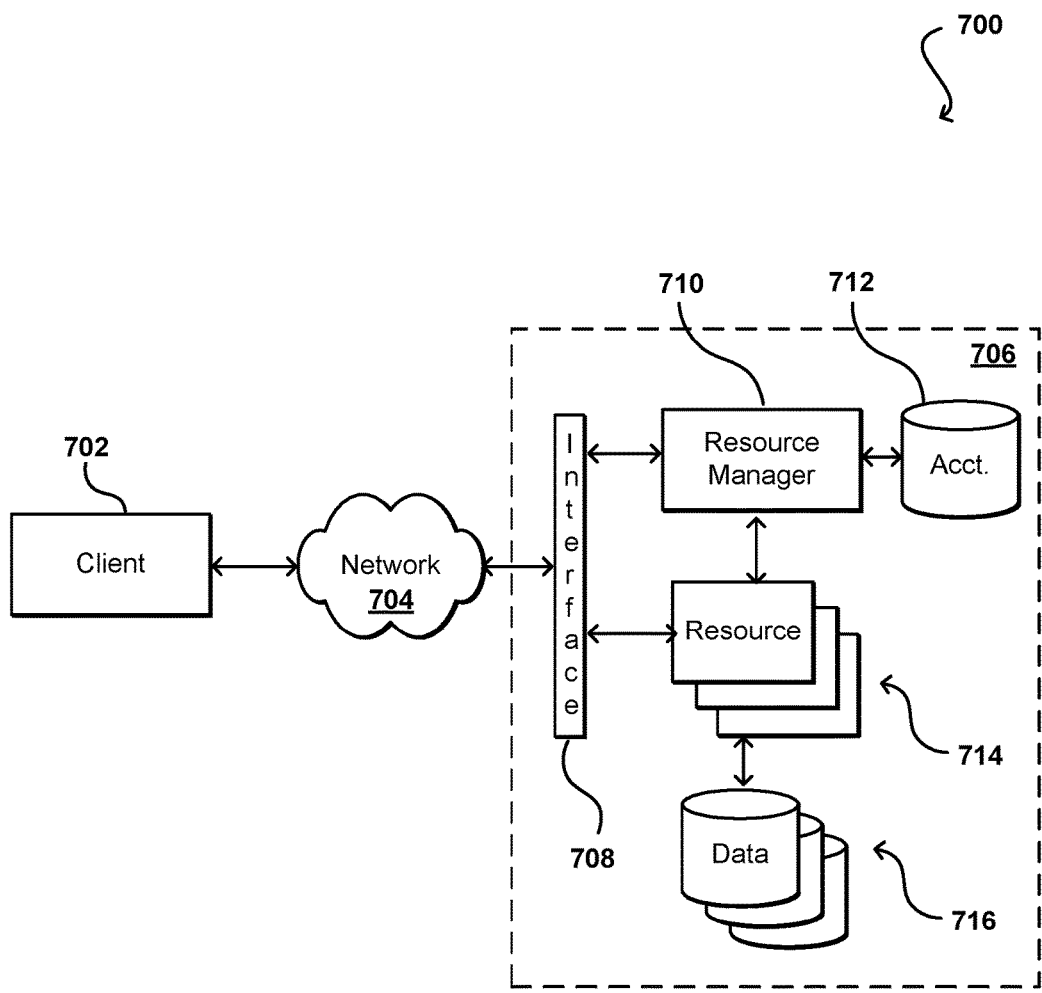
FIG. 7 illustrates an example environment in which various embodiments can be implemented.

FIG. 7 illustrates an example environment 700 in which aspects of the various embodiments can be implemented. Such an environment can enable aspects such as authentication to be performed remotely, and access credentials protected on the device can be used to access data and resources in a remote system or service, among other such options. In this example a user is able to utilize a client device 702 to submit requests across at least one network 704 to a resource provider environment 706. The client device can include any appropriate electronic device operable to send and receive requests, messages, or other such information over an appropriate network and convey information back to a user of the device. Examples of such client devices include personal computers, tablet computers, smart phones, notebook computers, and the like. The network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 714 of one or more types. These types can include, for example, application servers operable to process instructions provided by a user or database servers operable to process data stored in one or more data stores 716 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 702 to communicate with an allocated resource without having to communicate with the resource manager 710, at least until such time as a relevant aspect of the user account changes, the user is no longer granted access to the resource, or another such aspect changes.

The resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD)

or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a first request to store user data encrypted under a user key, the request specifying one or more user credentials for obtaining access to the user data and the user data including at least one of an access token, a credit card number, a social security number, a financial account number, a date of birth, or a health record;
   specifying a security identifier for the user data, the security identifier including at least one of an image, an animation, a video clip, a sound or sequence of sounds, a song clip, a haptic feedback pattern, or a light pattern;
   generating the user key and encrypting the user data using the user key;
   storing the user key and the security identifier;
   receiving a second request to access the user data, the second request specifying at least one incorrect user credential;
   presenting, in response to receiving the at least one incorrect user credential, an incorrect security identifier for confirmation by a submitter of the second request;
   receiving confirmation of the presented incorrect security identifier, the confirmation corresponding to a verification of the presented incorrect security identifier;
   generating a set of incorrect data values, in response to the confirmation of the presented incorrect security identifier, the incorrect data values having formats corresponding to the user data;
   changing the set of incorrect data values for subsequent confirmations of incorrect security identifiers; and
   providing, to the submitter of the second request, access to the set of incorrect data values, wherein the submitter does not receive the access to the user data.

2. The computer-implemented method of claim 1, further comprising:
   receiving a third request to access the user data, the third request specifying the one or more user credentials correct for obtaining access to the user data;
   causing the security identifier, corresponding to the correct user credentials, to be presented for confirmation from a submitter of the third request;
   receiving confirmation of the security identifier; and
   providing, to a source of the third request, access to the user data.

3. The computer-implemented method of claim 1, further comprising:
   providing a notification for the user that the second request was received with the at least one incorrect user credential;
   receiving a third request to access the user data, the third request specifying at least one incorrect user credential;
   determining a number of requests to access the user data exceeds a threshold value; and
   preventing a fourth request to access the user data for a determined period of time.

4. The computer-implemented method of claim 1, further comprising:
   providing a set of identifier options for the security identifier, the set of identifier options further including at least one of an identifier template, a type of character string, a set of font colors, a set of background colors, a set of sounds, a set of vibration patterns, a set of graphics, or a set of images;
   specifying a number of options to be selected; and
   receiving a selection of at least the number of options for the security identifier for the user data.

5. The computer-implemented method of claim 1, further comprising:
   generating one or more data values, of the set of incorrect data values, that is within a determined range of values of respective data values of the set of user data.

6. A computer-implemented method, comprising:
   receiving a request to access target data stored on an electronic device, the request specifying an access credential and the target data including at least one of an access token, a credit card number, a social security number, a financial account number, a date of birth, or a health record;
   determining that the access credential differs from a valid access credential for obtaining the access;
   presenting an incorrect security identifier to a source of the request, the security identifier including at least one of an image, an animation, a video clip, a sound or sequence of sounds, a song clip, a haptic feedback pattern, or a light pattern;
   receiving confirmation of the presented incorrect security identifier on behalf of the source of the request, the confirmation corresponding to a verification of the presented incorrect security identifier;
   generating a set of incorrect data values, in response to the confirmation of the presented incorrect security identifier, having formats corresponding to formats of the target data;
   changing the set of incorrect data values for subsequent confirmations of incorrect security identifiers; and
   providing access to the set of incorrect data values in response to the request, wherein the source receives the access to the incorrect data values without indication that the incorrect data values differ from the target data.

7. The computer-implemented method of claim 6, further comprising:
   receiving a second request to access the target data stored on the electronic device, the request specifying a second access credential;
   determining that the second access credential corresponds to a valid access credential for obtaining the access;
   causing a correct security identifier to be presented to a second source of the second request;
   receiving confirmation of the correct security identifier on behalf of the second source; and
   providing the second source with access to the target data.

8. The computer-implemented method of claim 6, further comprising:
   receiving an initial request to store the target data encrypted under an access key, the initial request specifying at least the access credential for obtaining access to the target data;
   causing the security identifier to be specified for the target data;

generating the access key and encrypting the target data using the access key; and storing the access key and the security identifier to a secure storage.

9. The computer-implemented method of claim 1, further comprising:

providing a set of identifier options for the security identifier, the set of identifier options including at least one of an identifier template, a type of character string, a set of font colors, a set of background colors, a set of sounds, a set of vibration patterns, or a set of images;

specifying a number of options to be selected; and receiving a selection of at least he number of options for the security identifier specified for the user data.

10. The computer-implemented method of claim 6, further comprising:

generating one or more data values, of the set of incorrect data values, that is within a determined range of values of respective data values of the target data.

11. The computer-implemented method of claim 6, further comprising:

providing a notification that the second request was received specifying the at least one incorrect access credential;

receiving a third request to access the user data, the third request specifying at least one incorrect user credential;

determining a number of requests to access the user data exceeds a threshold value; and preventing a fourth request to access the user data for a determined period of time.

12. The computer-implemented method of claim 6, wherein the access credential includes at least one of a password, a passcode, a personal identification number, a digital signature, a digital certificate, biometric data, voice data, or gesture data.

13. The computer-implemented method of claim 6, further comprising:

storing the target data encrypted under an access key using format-preserving cryptography.

14. A system, comprising:

at least one processor; and a memory including instructions that, when executed by the system, cause the system to:

receive a request to access target data stored on an electronic device, the request specifying a user credential and the target data including at least one of an access token, a credit card number, a social security number, a financial account number, a date of birth, or a health record;

determine that the user credential differs from a valid user credential for obtaining the access;

present an incorrect security identifier to a source of the request, the security identifier including at least one of an image, an animation, a video clip, a sound or sequence of sounds, a song clip, a haptic feedback pattern, or a light pattern;

receive confirmation of the presented incorrect security identifier on behalf of the source of the request, the confirmation corresponding to a verification of the presented incorrect security identifier;

generate, in response to the confirmation of the presented incorrect security identifier, a set of incorrect data values having formats corresponding to formats of the target data;

change the set of incorrect data values for subsequent confirmations of incorrect security identifiers; and provide access to the set of incorrect data values in response to the request, wherein the source receives the access to the incorrect data values without indication that the incorrect data values differ from the target data.

15. The system of claim 14, wherein the instructions when executed further cause the system to:

receive a second request to access the target data stored on the electronic device, the request specifying a second user credential;

determine that the second user credential corresponds to a valid user credential for obtaining the access;

cause a correct security identifier to be presented to a second source of the second request;

receive confirmation of the correct security identifier on behalf of the second source; and provide the second source with access to the target data.

16. The system of claim 14, wherein the instructions when executed further cause the system to:

receive an initial request to store the target data encrypted under a user key, the initial request specifying at least the user credential for obtaining access to the target data;

cause the security identifier to be specified for the target data;

generate the user key and encrypting the target data using the user key; and store the user key and the security identifier to a secure storage.

17. The system of claim 14, wherein the instructions when executed further cause the system to:

provide a set of identifier options for the security identifier, the set of identifier options including at least one of an identifier template, a type of character string, a set of font colors, a set of background colors, a set of sounds, a set of vibration patterns, or a set of images;

specify a number of options to be selected; and receive a selection of at least the number of options for the security identifier specified for the target data.

18. The system of claim 14, wherein the instructions when executed further cause the system to:

generate one or more data values, of the set of incorrect data values, that is within a determined range of values of respective data values of the set of target data.

* * * * *